United States Patent [19]
Fuentes

[11] Patent Number: 5,999,810
[45] Date of Patent: *Dec. 7, 1999

[54] ARCHITECTURE FOR A WIRELESS TELECOMMUNICATION SYSTEM

[75] Inventor: James Joseph Fuentes, South Barrington, Ill.

[73] Assignee: Lucent Technologies Inc., Murray Hill, N.J.

[*] Notice: This patent is subject to a terminal disclaimer.

[21] Appl. No.: 08/548,695

[22] Filed: Oct. 26, 1995

Related U.S. Application Data

[63] Continuation of application No. 08/315,314, Sep. 29, 1994, abandoned, which is a continuation of application No. 07/928,386, Aug. 11, 1992, abandoned.

[51] Int. Cl.$^6$ ....................................................... H04Q 7/26
[52] U.S. Cl. ............................................ 455/422; 455/417
[58] Field of Search ...................................... 455/422, 461, 455/466, 517

[56] References Cited

U.S. PATENT DOCUMENTS

| | | | |
|---|---|---|---|
| 4,009,347 | 2/1977 | Flemming | 370/95.3 |
| 4,242,538 | 12/1980 | Ito et al. | 179/2 EB |
| 4,259,549 | 3/1981 | Stehman | 379/204 |
| 4,596,010 | 6/1986 | Beckner et al. | 370/60 |
| 4,599,490 | 7/1986 | Cornell et al. | 179/2 EB |
| 4,817,089 | 3/1989 | Paneth et al. | 370/95 |
| 4,827,499 | 5/1989 | Warty et al. | 379/58 |
| 4,875,039 | 10/1989 | Andros et al. | 340/825.44 |
| 4,879,740 | 11/1989 | Nagashima et al. | 379/61 |
| 4,896,346 | 1/1990 | Belfield et al. | 379/88 |
| 4,970,723 | 11/1990 | Lin | 370/110.1 |
| 5,133,001 | 7/1992 | Böhm | 379/58 |
| 5,157,660 | 10/1992 | Kuwahara et al. | 455/517 |
| 5,210,787 | 5/1993 | Hayes et al. | 379/60 |
| 5,278,890 | 1/1994 | Beeson, Jr. et al. | 379/57 |
| 5,278,892 | 1/1994 | Bolliger et al. | 455/442 |
| 5,412,660 | 5/1995 | Chen et al. | 455/12.1 |

OTHER PUBLICATIONS

America Online, Mar. 3, 1995.
Rahnema, "Overview of the GSM System and Protocol Architecture" IEEE Communication Magazine, Apr. 1993.
V. Breton et al, "Tangara: digital cordless telephone system", Commutation Et Transmission,vol. 13, No. 3, 1991, Paris, pp. 23–32.
Duplessis, Maillard, "Pan–European Digital Cellular System for Mobile Telephones", Commutation and Transmission #2 1986.
Ballard, et al "Cellular Mobile Radio as an Intelligent Network Application" Electrical Communication, vol. 63, #4 1989.
Weib, et al "System 900: The ISDN Approach to Cellular Mobile Radio", Electrical Communication, vol. 63, #4 1989.
Modarressi, et al "Signaling System No. 7: A Tutorial" IEEE Communications Magazine Jul. 1990.
Ultraphone 100, Wireless Digital Loop Carrier™, System Description, International Mobile Machines Corporation, 1987, pp. 1.1–5.3.

Primary Examiner—Dwayne D. Bost
Assistant Examiner—Myron K. Wyche
Attorney, Agent, or Firm—Werner Ulrich; Dennis J. Williamson

[57] ABSTRACT

A method and apparatus for offering wireless telecommunication service. A switch such as an automatic Private Branch Exchange (PBX), equipped to communicate with Integrated Services Digital Network (ISDN) stations sends ISDN signaling messages to and receives ISDN signaling messages from a protocol converter. The protocol converter, which also communicates with a wireless cell site, converts messages between the ISDN protocol and a protocol for communicating with the wireless cell site. The cell site sets up wireless connections to a mobile station, essentially in its prior art mode, and the PBX sets up connections to the cell site essentially in its prior art ISDN station control mode.

13 Claims, 3 Drawing Sheets

ARCHITECTURE FOR A WIRELESS TELECOMMUNICATION SYSTEM

This application is a continuation of application Ser. No. 08/315,314, filed Sep. 29, 1994 now abandoned, which application is a continuation of application Ser. No. 07/928,386, filed on Aug. 11, 1992 now abandoned.

TECHNICAL FIELD

This invention relates to wireless telecommunication systems and, more specifically, to architecture for small growable wireless telecommunication networks.

Problem

Wireless telecommunication networks have grown very rapidly in the past decade as a result of substantial breakthroughs in the cost of wireless telecommunication terminals, otherwise known as mobile stations. Such mobile stations exist in many forms from those which are mounted in automobiles to portable stations to hand held stations. The cellular principle has permitted a large growth in the amount of wireless telecommunications which can be carried over the allocated radio spectrum thus allowing a huge growth in the number of wireless telecommunication subscribers.

While major cost breakthroughs have taken place in the customer equipment (the radio transceivers for communicating with the cellular systems), a similar cost breakthrough has not taken place in the central office equipment required to establish connections between customer stations. In particular, while large systems have been designed whose per subscriber cost is not high, small and inexpensive but growable small wireless switching system is not available in the prior art.

Solution

The above problem is solved and an advance is made over the prior art in accordance with this invention wherein a moderate size switching system, such as a midsize private branch exchange (PBX) is used as the mobile telecommunication switching office; in a departure from the prior art, this system is adapted for use in the cellular application by virtue of an architecture which allows the PBX to communicate with the cell sites of the cellular system as if these cell sites were other PBXs communicating, via a system using out of band signaling, such as that used in integrated services digital network (ISDN) communication links, wherein the out of band signaling communicates with a protocol converter to convert between ISDN and cell site protocols. In one embodiment, the cell sites, which are existing prior art cell sites, receive data communications from a protocol converter inserted in the data link part of the ISDN connection; the protocol converter converts signals from the PBX from ISDN protocol to a protocol accepted by the cell site and converts cell site data messages in a protocol normally destined for a mobile switch from the cell site protocol to an ISDN protocol. Advantageously, such an arrangement permits the PBX to set up cellular connections in essentially the same way that the PBX is already equipped to set up ISDN connections.

In one specific embodiment of the invention, a primary rate interface carrying a plurality of B-channels and one D-channel is used to connect the PBX with a cell site; the protocol converter in this case converts messages on the D-channel. A plurality of primary rate interfaces may share a single D-channel on one of these interfaces. Advantageously, the protocol converter need only communicate with a small number of data channels. Advantageously, the development effort is minimized because existing PBXs, cell sites, and ISDN and cell site protocols are used, so that only software for the protocol converter needs to be developed.

In one embodiment of the invention, the PBX is connected to a class 5 switching office, such as AT&T's 5ESS® switch, in order to perform more specialized and more complex call functions such as voice mail and to access the public switched telephone network for accessing mobile or land-based telephone stations not served by the PBX. Further, the class 5 switching office is able to be connected to a plurality of PBXs in order to interconnect mobile stations connected to these PBXs to each other and to the public switched telephone network.

In one embodiment, the PBX is connected to other PBXs by primary rate interface connections. This permits connections to be set up between stations served by two different PBXs connected by such a primary rate interface. In one specific embodiment of the invention, the PBX is a System 75 DEFINITY® PBX which is manufactured by AT&T. Such a system is adapted to interface with other PBXs via primary rate interface ISDN communication links. Advantageously, the use of such a system avoids the need for reprogramming a PBX to accomplish the objectives of the invention.

In accordance with another specific embodiment of applicant's invention, land-based customer lines are also connectable to the PBX. Advantageously, the PBX can then serve both land-based and mobile stations.

Growth for such a system is straightforward. First, the capacity of the cell site is increased to its maximum. Then, additional cell sites are added under the control of one PBX. Then, another PBX may be added, along with its cell sites. Finally, an Autoplex® 1000 system such as that described in U.S. Pat. no. 4,827,499 can be formed by adding a control processing complex to control the PBXs and the cell sites, or the PBXs may be replaced by a mobile communications telecommunication switch which can communicate directly with the cell sites without using a protocol converter.

DETAILED DESCRIPTION

Figure 1:
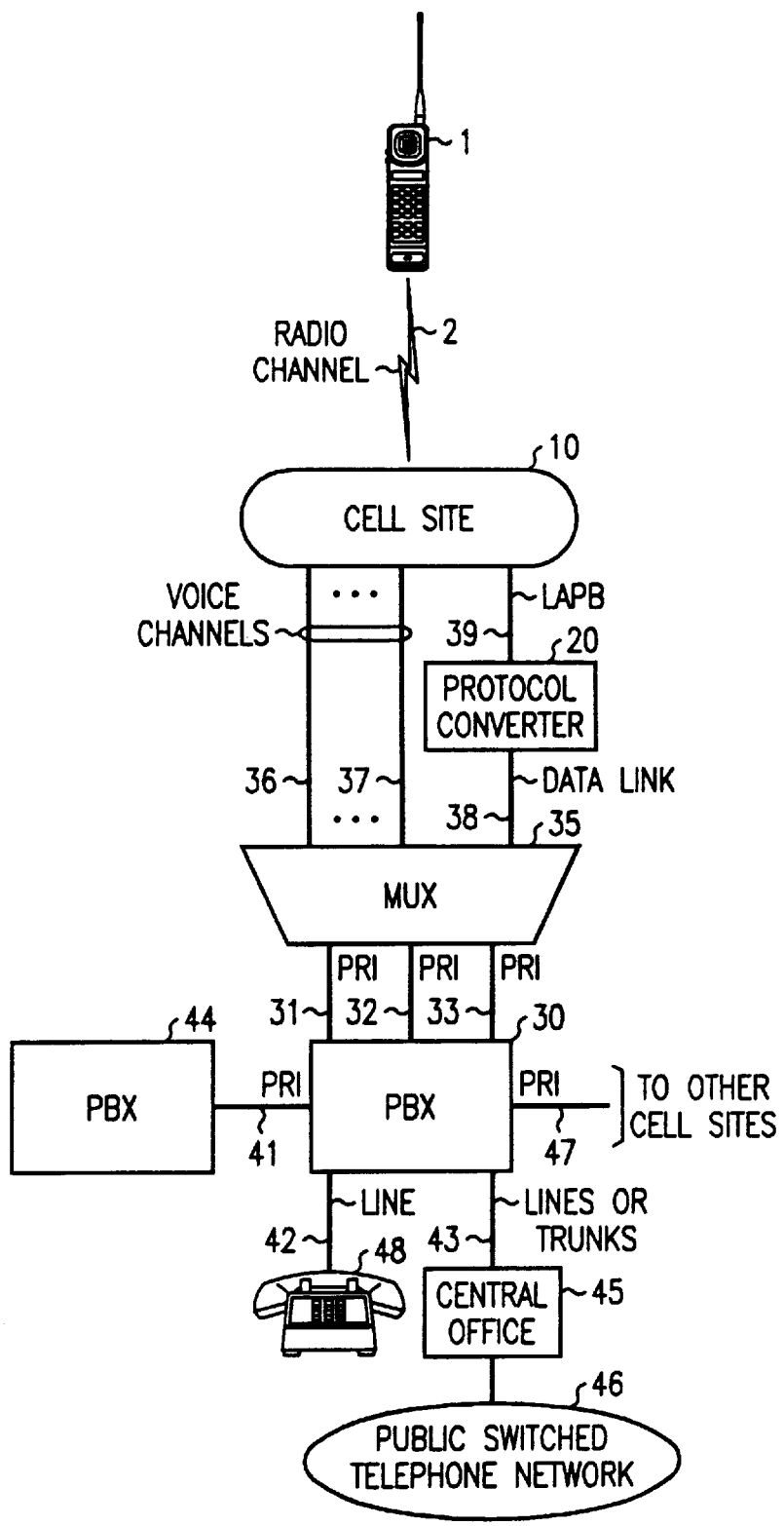
FIG. 1 is a block diagram illustrating the operation of the invention.

FIG. 1 is a block diagram illustrating the operation of applicant's invention. A radio cell site 10 communicates via radio channel 2 with a mobile station 1. A cell site such as the Autoplex® Series I Mod II Cell Site can be used in this application. A different cell site can be used if the European Global Systems for Mobile Communications (GSM) standard protocol is required. The cell site is connected by a multiplexer 35 to one or more primary rate interface integrated services digital network (PRI-ISDN) communication channels 31, 32, 33 to a private branch exchange (PBX) 30. The multiplexer 35 strips the D-channel from the PRI signals and sends these D-channel signals via data link 38 to protocol converter 20 connected via data link 39 to cell site 10. A plurality of communication links 36, 37 connect multiplexer 35 to cell site 10 for carrying B-channel voice and data signals between the multiplexer and cell site. A multiplexer such as the Crossnet 442 multiplexer manufactured by Tellabs can be used. A NCR 3330 486 based computer manufactured by NCR Inc. can be used as the PC; the NCR computer must be equipped with an interface board such as a DLPI/HDLC Controller Board for UNIX® systems to terminate the two data links to the PC. Cell site 10 receives its control signals over the data link 39 and transmits its responses and its own initiated data messages over that link. The protocol converter converts between ISDN control messages specified in the CCITT Q.931 call control message set and the message set required to interface with a cell site. This message set may be proprietary or it may conform with a standard such as that specified in the European GSM standard for wireless communications.

PBX 30 is also connected by lines such as line 42 to land based telephone stations such as station 48; by one or more PRI facilities 41 to one or more other PBXs 44, the latter being for connection to the other cell sites; by one or more PRI facilities 47 to one or more other cell sites connected to PBX 30; and by facilities such as lines or trunks 43 to a class 5 central office switch 45, the latter being for connection to a public switched telephone network for accessing of telephones and mobile stations outside the immediate region covered by PBXs 30 and 44 and central office 45. The connection to the class 5 central office can be over line facilities, one or more PRI facilities, or even T-carrier trunk facilities; a line interface is the most natural for communicating between a PBX and a central office, specially an older central office, and simplifies the process of billing at the central office.

The PBX keeps track of the busy-idle state of all mobile stations currently associated with a cell site. When a disconnect is received, the B-channel is made available through a release message from the PC; this makes the B-channel, and its associated radio channel, available, and changes the busy-idle state of the mobile station to idle.

Figure 2:
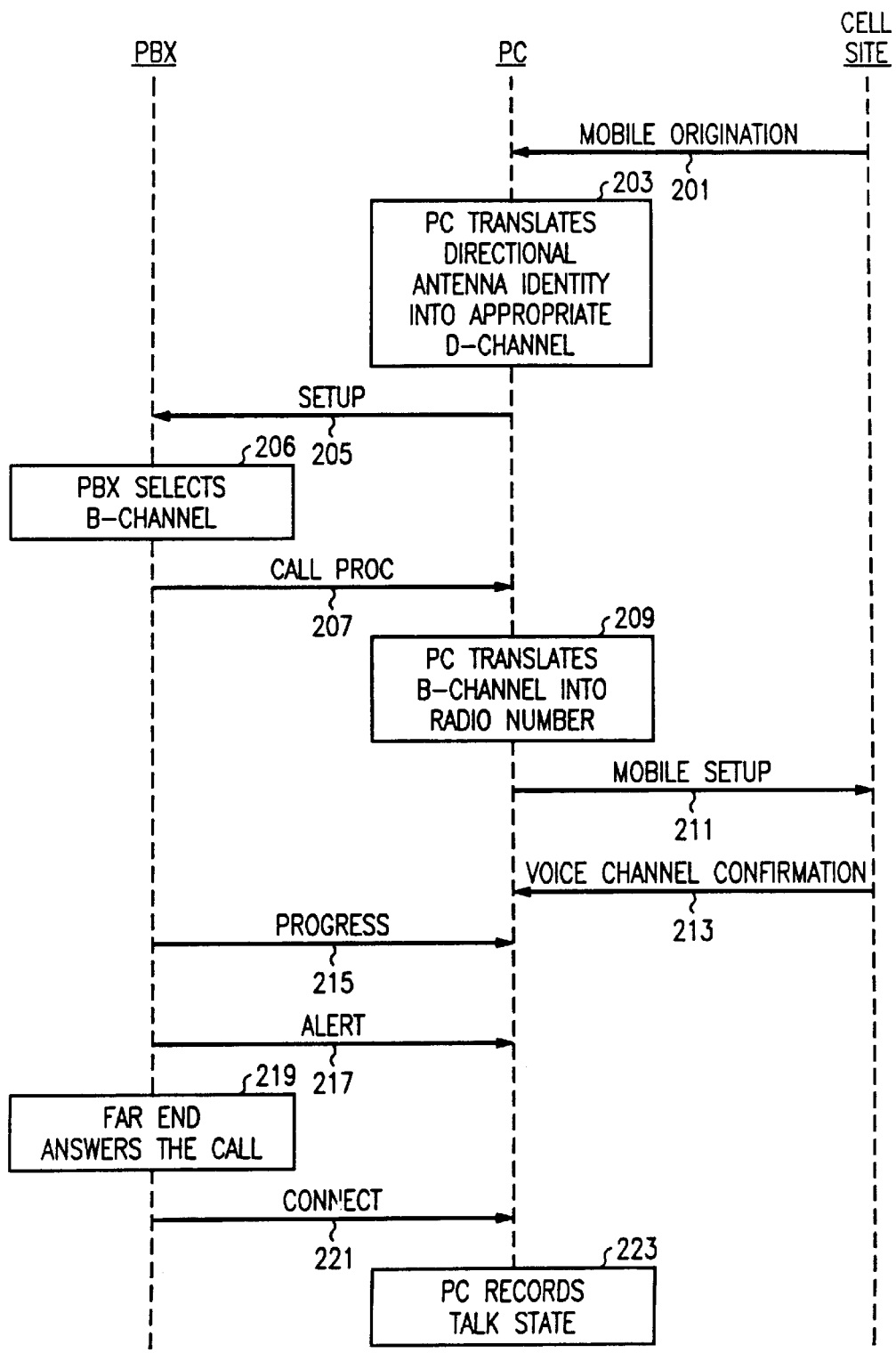
FIGS. 2 and 3 are flow and message diagrams illustrating the steps of establishing an incoming and an outgoing call.

FIG. 2 illustrates the messages and the actions performed by the protocol converter 20 in setting up a wireless originated call. The cell site 10 receives an indication from the mobile station 1 that the mobile station wishes to originate and receives the number of the called customer dialed by the originating mobile station. Cell site 10 sends message 201 to PC 20, the message containing an identification of the calling main station, the called number, and an indication of which directional antenna is optimum for use on this call. The mobile station picks the set-up channel that corresponds to the optimum directional antenna. The protocol converter 20 translates the directional antenna identity into the appropriate D-channel 39 for use in communicating with the PBX 30. If one D-channel serves all of the PRIs connecting the PBX to the cell site, this translation is not required. The PC then transmits a set-up message 205, including the called directory number and an identity of the caller, to PBX 30. As shown in action box 206 PBX 30 then selects a B-channel appropriate for use with the identified directional antenna and transmits over D-channel 38 a call proceed message 207 identifying the selected B-channel. In action block 209, PC 20 translates the B-channel identity into a radio number and transmits a mobile set-up message 211 to the cell site to establish communication between the selected B-channel and the mobile station 1. The cell site 10 having confirmed the establishment of such a radio communication then returns to the protocol converter 20 a voice channel confirmation message 213.

In the meantime, PBX 30 has been establishing the other end of the connection and transmits a series of call progress messages 215 to PC 20 which maintains track of the status of the connection. When the connection has been established, an alert message 217 is sent from PBX 30 to PC 20 indicating that the called customer is being alerted. The calling customer hears audible tone. The PBX 30 then detects that the call has been answered (action block 219) and transmits a connect message 221 to the PC 20. In response, the PC 20 records that the connection is now in the talk state (action block 223).

Figure 3:
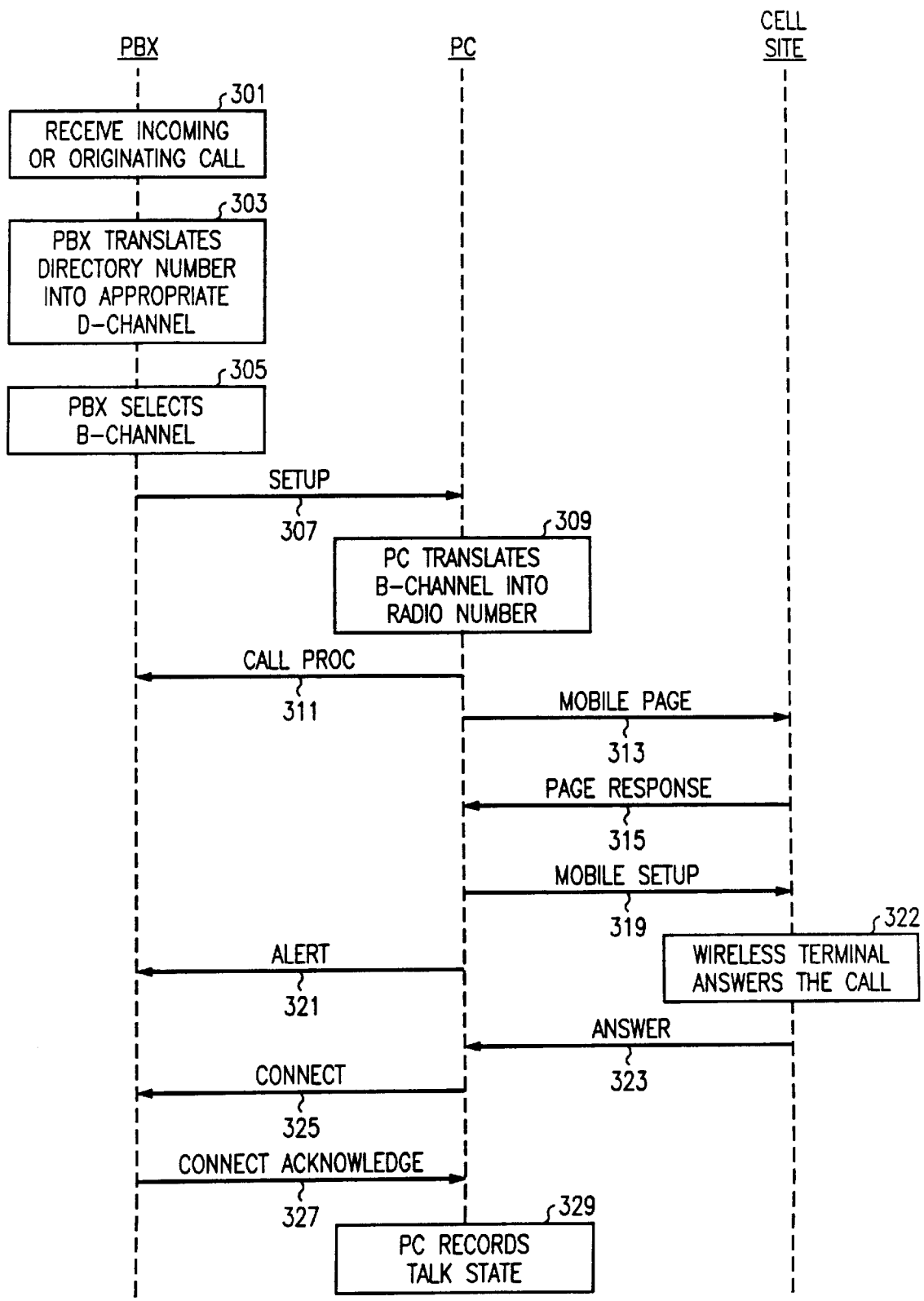

FIG. 3 illustrates a wireless terminated call. Action block 301 indicates that the PBX has received an incoming or an originating call. The PBX translates the directory number into the appropriate D-channel for use in communicating with the protocol converter (action block 303). The PBX then selects a B-channel to be used for this conversation (action block 305). In this embodiment, each PRI can serve only one cell site sector, but several PRIs may serve one sector. The PBX then sends a set-up message including the identity of the called main station and the identity of the B-channel to be used for the connection (message 307). The PC 20 translates this B-channel number into a radio number (action block 309) and transmits, in response, a call process proceeding message 311 back to the PBX. The PC 20 then transmits a request to page the mobile via message 313 transmitted over data channel 39 to cell site 10. Cell site 10 pages the mobile and if the mobile responds properly, transmits a page response message 315 back to PC 20. The PC then sends a mobile set-up message 319 to the cell site requesting that the connection between the selected B-channel and the mobile station be established and that that connection be monitored to determine whether the called mobile station answers the call. The PC also sends an alert message back to the PBX to indicate that the calling party should receive audible ringing tone. When the wireless terminal answers the call (action block 322) an answer message 323 is sent from the cell site to the PC. The PC passes on a connect message 325 to request that the PBX complete the connection to the called customer and remove the audible ringing tone connection. After completing this task, the PBX returns a connect acknowledge message 327 to the PC and the PC records the talking state for that connection (action block 329).

Usually, the PBX is connected to a class 5 central office (end office) or to a tandem or toll switching system in order to allow the wireless customers to access the public switched telephone network. By connecting the PBX to a class 5 central office, it is possible to handle the roaming problem in a very straightforward way. If a roamer enters the area covered by the cell site of the exemplary system, and turns on its radio in order to perform the registration function, well known in the prior art, the cell site transmits information concerning the roamer to a PBX which forwards it to a central office. The central office then initializes the PBX to be able to accept calls from that roamer and notifies a larger wireless systems network of the location of the roamer. Calls to parties not connected to the PBX via either a radio channel or a direct connection are handled by connections from the PBX to the controlling central office. The latter can then establish a connection over public switched telephone network to any destination. Incoming calls can similarly be handled by terminating such calls to the connected central office and completing the connection through a connection to the PBX followed by a connection to a line connected to the PBX directly or via a radio channel.

The central office can be connected to the PBX using any of the standard central office PBX transmission and signaling facilities. The use of a common channel signaling arrangement between the PBX and the central office enhances the flexibility of the system.

The PBX is connectable to several cell sites. If automatic hand-off of a call among different cells is a system requirement, it can be implemented as follows: The cell site detects that the radio signal is below a threshold and requests power levels from neighboring cells. This can be accomplished by sending X.25 messages to the specified destinations, i.e., the neighboring cells. The X.25 messages are sent transparently via the PBX. The replies are similarly transmitted. The protocol converter selects the hand-off cell site and sends a message to the PBX to set up a conference call whose three legs are the two legs of the existing connection and a connection to the hand-off cell site. After the hand-off has been completed, the original cell site connection is dropped.

Unless the system is restricted to working only with mobile stations in a home cell site sector, registration is required. When a mobile station turns on power, an autonomous registration message is sent to the cell site. The PC has a list of home subscribers, including their mobile serial numbers. If the registration is for a home subscriber, the PC validates the autonomous registration message, including the mobile serial and directory number, and notifies the PBX so that a subsequent call is routed to that cell site sector. If the registration is for a mobile station registering at a non-home cell site sector, the PC generates a call forwarding request to the PBX to notify the PBX, and, where appropriate, a connected central office, to route calls destined for the registering subscriber's telephone number to the correct PBX and cell site. The central office signals through the public telephone network to the home office of the roaming mobile station to forward the calls to the cell site's private number.

Growth for such a system is straightforward. First, the capacity of the cell site is increased to its maximum. Then, additional cell sites are added under the control of one PBX. Then, another PBX may be added, along with its cell sites. Finally, an Autoplex 1000 system such as that described in U.S. Pat. No. 4,827,499 can be formed by adding a control processing complex to control the PBXs and the cell sites, or the PBXs may be replaced by a mobile communications telecommunication switch which can communicate directly with the cell sites without using a protocol converter.

An advantage of this system is the relatively simple functionality required at the PBX. As it becomes easier to provide advanced functionality at the PBX, this PBX can be enhanced to control handoffs using essentially the same methods that are already well known in the prior art.

This particular embodiment has illustrated ISDN protocol and an ISDN PRI interface to the PBX. The advantage is that the PBX can then interface with the PC and the cell site as if these were ordinary connections to the PBX. Any other arrangement which allows an out of band telephone station control (OTSC) signaling protocol for controlling telephone stations to be conveniently terminated on the PBX would also meet this requirement.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A wireless telecommunication system, comprising:
   a telecommunication switching system (switch) for exchanging signaling messages with land based stations and land based switching systems, said switch lacking the capability to exchange signaling messages with cell sites;
   a cellular wireless cell site; and
   protocol conversion means for converting between signaling messages carrying call processing commands and responses in a cell site control protocol, said cell site control protocol for signaling to, and receiving signals from, a wireless cell site, and signaling messages carrying call processing commands and responses in an out-of-band telephone station control, (OTSC), protocol;
   wherein said cell site control protocol for carrying call processing commands and responses is different from the OTSC protocol for carrying call processing commands and responses;
   said switch connected to said cell site by a plurality of unswitched communication links;
   said switch, and said cell site, being connected by data link means to said protocol conversion means;
   wherein said switch sends OTSC protocol signaling messages for carrying call processing commands and responses, said OTSC signaling protocol messages used for controlling land based telephone stations, to said protocol conversion means, as if it were communicating directly with a land based telephone station, and said protocol conversion means converts said OTSC protocol signaling messages for carrying call processing commands and responses to cell site control protocol signaling messages for carrying call processing commands and responses for transmission to said cell site, for controlling said cell site;
   wherein said cell site sends cell site control protocol signaling messages for carrying call processing commands and responses, said cell site protocol signaling messages for carrying call processing commands and responses used for communicating with a mobile switching center, to said protocol conversion means as if it were communicating directly with a mobile switching center for communicating with cell sites, and said protocol conversion means converts said cell site control protocol signaling messages to OTSC protocol signaling messages for carrying call processing commands and responses for transmission to said switch.

2. A wireless telecommunication system comprising:
   an automated Private Branch Exchange (PBX) for exchanging signaling messages with land based stations and land based switching systems, said PBX lacking the capability to exchange signaling messages with cell sites;
   a wireless cell site; and
   protocol conversion means for converting between signaling messages in a cell site control protocol for carrying call processing commands and responses, said cell site control protocol for carrying call processing commands and responses for signaling to, and receiving signals from, a wireless cell site, and signaling messages in an Integrated Services Digital Network, (ISDN), protocol for carrying call processing commands and responses for signaling to, and receiving signals from, ISDN stations;
   wherein said cell site control protocol for carrying call processing commands and responses is different from the ISDN protocol for carrying call processing commands and responses;
   said PBX connected to said cell site by a plurality of unswitched communication links;
   said PBX connected to said cell site by data link means via said protocol conversion means;
   wherein said PBX sends and receives ISDN signaling messages, said ISDN protocol messages for carrying call processing commands and responses used for communicating between land based telephone stations and land based switching systems, to said protocol conversion means as if it were communicating directly with a land based telephone station, and said protocol conversion means converts said ISDN protocol signaling messages for carrying call processing commands and responses to cell site control protocol signaling messages for carrying call processing commands and responses for transmission to said cell site, for controlling said cell site;

wherein said cell site sends cell site control protocol signaling messages for carrying call processing commands and responses, said cell site control protocol signaling messages for carrying call processing commands and responses used for communicating with a mobile switching center, to said protocol conversion means as if it were communicating directly with a mobile switching center for communicating with cell sites, and said protocol conversion means converts said cell site control protocol signaling messages for carrying call processing commands and responses to ISDN protocol signaling messages for carrying call processing commands and responses for transmission to said PBX.

3. The system of claim 2 wherein said plurality of communication links comprises B-channels of an ISDN Primary Rate Interface (PRI) and the data link means between said PBX and said protocol conversion means is a D-channel of said PRI.

4. The system of claim 2 further comprising:
land based customer lines connected to said PBX for communicating with mobile stations served by said cell site.

5. The system of claim 2 wherein said PBX is connectable via a central office switching system to a public switched telephone network.

6. The system of claim 2 wherein said PBX is connectable to another PBX, said another PBX for serving another cell site, wherein subscribers connectable to said PBX are connectable to subscribers connectable to said other PBX.

7. In a wireless telecommunications network including a cell site connected to a switch, said switch including support for a protocol for exchanging Integrated Services Digital Network (ISDN) protocol signaling messages for carrying call processing commands and responses with land based stations and land based switches, messages in said protocol not being usable by said cell sites to establish a wireless connection, a method of paging a mobile station served by the wireless cell site, comprising the steps of:

receiving an incoming call at a telecommunication switch (switch), said switch being connected to said cell site by a plurality of unswitched communication links;

transmitting an ISDN call set-up control message from said switch over a data link to a protocol converter;

converting, in said protocol converter, said call set-up message to a paging message usable by said cell site;

transmitting said paging message from said protocol converter to said cell site over a data link; and responsive to receiving a paging response message from said cell site, transmitting a mobile set-up message to said cell site, and an ISDN alert message to said switch via said protocol converter; and establishing a voice channel over a communication link separate from said data link for transmitting voice signals between said cell site and said switch;

wherein said cell site uses a control protocol, comprising said paging message, and said paging response message, different from an ISDN protocol using said ISDN call set-up message, and said ISDN alert message.

8. The method of claim 7 wherein said switch is an automatic Private Branch Exchange (PBX).

9. The method of claim 7 wherein said ISDN message is sent over a D-channel of a Primary Rate Interface (PRI).

10. A method of controlling wireless calls served by a telecommunications switching system and a cell site, said cell site and said telecommunication switching system communicating signaling information by exchanging signaling messages, comprising the steps of:

communicating via first signaling messages from said cell site in a first protocol for carrying call processing commands and responses;

communicating via second signaling messages from said telecommunications switching system (switch) in a second protocol for carrying call processing commands and responses;

said second protocol for carrying call processing commands and responses for exchanging signaling messages with land based stations and land based switching systems, and said second protocol for carrying call processing commands and responses being different from said first protocol for carrying call processing commands and responses, such that said switch lacks the capability to exchange signaling messages with said cell site;

providing a protocol converter;

converting in said protocol converter, said first signaling messages in said first protocol for carrying call processing commands and responses to signaling messages in said second protocol for carrying call processing commands and responses for transmission to said switch; and converting, in said protocol converter, said second signaling messages in said second protocol for carrying call processing commands and responses to signaling messages in said first protocol for carrying call processing commands and responses for transmission to said cell site;

connecting said protocol converter to said cell site and said switch by control data links;

connecting said switch by a plurality of unswitched communication links to said cell site for transmitting voice signals, said communication links being separate from said data links;

wherein said second protocol is an Integrated Services Digital Network (ISDN) protocol;

wherein said first protocol for carrying call processing commands and responses is a cell site control protocol, and is different from said ISDN protocol.

11. The method of claim 10 wherein said switch is an automatic Private Branch Exchange (PBX).

12. In a wireless telecommunications network including a cell site connected to a switch, said switch including a protocol for exchanging Integrated Services Digital Network (ISDN) messages with land-based stations, and land based switches, said protocol not being usable by said cell sites to establish a wireless connection, a method of serving an origination received in a wireless cell site, comprising the steps of:

receiving a mobile station service request at said cell site;

transmitting a mobile origination message from said cell site to a protocol converter;

transmitting an ISDN set-up message from said protocol converter to a switch, said switch being connected to said cell site by a plurality of unswitched communication links; and transmitting a mobile set-up message to said cell site from said protocol converter;

connecting said protocol converter to said cell site and said switch by control data links separate from communication links for transmitting voice and data signals;

wherein said first protocol is a cell site control protocol for carrying call processing commands and responses, and is different from said ISDN protocol.

13. A wireless telecommunication system, comprising:

a wireless cell site for communicating with switch means, using cell site control signaling protocol messages;

a plurality of unswitched communication links;

data transmission means for transmitting data;

switch means for exchanging cell site protocol signaling messages for carrying call processing commands and responses with said cell site over said data transmission means, and for establishing connections among land based telecommunication lines and said plurality of unswitched communication links, said unswitched communication links for interconnecting said switch means and said wireless cell site;

characterized in that said switch means, comprises a PBX and protocol converter means;

said PBX for exchanging communications with land based telecommunication stations, and land based switching systems, using land based protocol signaling messages for carrying call processing commands and responses;

said protocol converter means, connected to said data transmission means for converting between said cell site protocol signaling messages for carrying call processing commands and responses received from said wireless cell site to said land based protocol signaling messages for carrying call processing commands and responses for transmission to said PBX, and for converting between said land based protocol signaling messages for carrying call processing commands and responses received from said PBX, to cell site control protocol messages for carrying call processing commands and responses, for transmission to said wireless cell site;

wherein said protocol converter is connected to said wireless cell site and said switch by control data links;

wherein the protocol of said wireless cell site control signaling protocol messages for carrying call processing commands and responses, is different from a protocol of said land based protocol signaling messages for carrying call processing commands and responses.

* * * * *